(12) United States Patent
Luo et al.

(10) Patent No.: US 10,166,617 B2
(45) Date of Patent: Jan. 1, 2019

(54) ELECTRODES FOR AND METHODS OF ELECTRICAL DISCHARGE MACHINING

(71) Applicant: General Electric Company, Schenectady, NY (US)

(72) Inventors: Yuefeng Luo, Liberty Township, OH (US); Allan R. Bridges, Batavia, OH (US); Christopher Alan Panczyk, Maineville, OH (US); Jason Crumb, Eastlake, OH (US); Christopher Mark Andrew Philp, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 185 days.

(21) Appl. No.: 15/244,021

(22) Filed: Aug. 23, 2016

(65) Prior Publication Data

US 2018/0056419 A1    Mar. 1, 2018

(51) Int. Cl.
| | | |
|---|---|---|
| *C23C 16/52* | (2006.01) | |
| *B23H 1/04* | (2006.01) | |
| *B23H 9/00* | (2006.01) | |
| *B23H 9/10* | (2006.01) | |
| *C04B 35/80* | (2006.01) | |

(52) U.S. Cl.
CPC ............ *B23H 1/04* (2013.01); *B23H 9/006* (2013.01); *B23H 9/10* (2013.01); *C04B 35/80* (2013.01)

(58) Field of Classification Search
CPC ................................. B23H 1/04; B23H 1/10
See application file for complete search history.

(56) References Cited

U.S. PATENT DOCUMENTS

| | | | | |
|---|---|---|---|---|
| 2003/0104276 A1* | 6/2003 | Mizuno | ................ | H01M 2/06 429/181 |
| 2013/0206733 A1* | 8/2013 | Levasseur | ............. | B23H 9/10 219/69.17 |

* cited by examiner

*Primary Examiner* — Joseph A Miller, Jr.
(74) *Attorney, Agent, or Firm* — General Electric Company; William Scott Andes (57) ABSTRACT

Electrodes for and methods of electrical discharge machining are provided. For example, a method for forming a feature in a ceramic matrix composite (CMC) component comprises repeatedly advancing an electrode into and retracting the electrode from the CMC component until a desired depth is reached, where the electrode has a head end, a tip end, and a shaft extending from the head end to the tip end. The shaft has a first side and a second side each recessed inward such that the head end and the tip end are wider than the shaft. A method for forming a feature in a CMC component also may include feeding a dielectric fluid into the feature utilizing the recessed sides. In some embodiments, electrodes may include a shaft extending from a head end to a tip end and a central plane, where the shaft is recessed widthwise toward the central plane.

11 Claims, 7 Drawing Sheets

ELECTRODES FOR AND METHODS OF ELECTRICAL DISCHARGE MACHINING

FIELD OF THE INVENTION

The present subject matter relates generally to electrodes for use in electric discharge machining (EDM) and particularly to EDM electrodes for efficiently machining ceramic matrix composite (CMC) components. More particularly, the present subject matter relates to EDM electrodes having features for minimizing surface roughness and micro-cracks in machined surfaces of CMC components and to methods of electrical discharge machining. Most particularly, the present subject matter relates to electrodes and methods with features for simultaneously increasing the EDM speed and minimizing surface roughness and micro-cracks.

BACKGROUND OF THE INVENTION

Non-traditional high temperature materials, such as ceramic matrix composite (CMC) materials, are more commonly being used for various components that are exposed to high temperatures. Exemplary CMC materials comprise ceramic fibers embedded within a matrix material such as silicon carbide, silicon nitride, etc., or combinations thereof. Because CMC materials can withstand relatively extreme temperatures, there is particular interest in replacing components within a flow path of combustion gases within a gas turbine engine with CMC materials. More particularly, a gas turbine engine generally includes a fan and a core arranged in flow communication with one another. The core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. In general, turbine performance and efficiency may be improved by increased combustion gas temperatures. Therefore, there is increased interest in forming gas turbine components from CMC materials that can withstand such increased combustion gas temperatures.

However, forming components from CMC materials often presents several manufacturing challenges, including productivity, quality, and cost challenges. More specifically, typical CMC components comprise silicon carbide, requiring a process using diamond material to cut the CMC component. As an example, an ultrasonic machining process using a diamond flow may be used to cut, e.g., seal slots in a CMC component, but the diamonds mix with the CMC fibers and matrix material such that the diamonds are difficult to recycle. Accordingly, such processes are expensive. Further, component seal slots typically have high aspect ratios that make machining such slots difficult. For example, conventional cutting and grinding processes for seal slots are limited by tool deflection and speed as well as accessibility to tight corners and sides, and laser cutting processes are limited by the taper of the slot sides. Moreover, seal slots must have limited surface roughness to ensure high sealing efficiency and structural stability. However, laser machining processes can generate thermal stresses and micro-cracks in CMC components, often with a slot taper that is beyond the required tolerance, and conventional grinding and machining processes typically cannot machine slot corners, much less smooth corners.

As a result, electric discharge machining (EDM) processes generally are the most appropriate processes for defining features such as seal slots in CMC components. Nonetheless, EDM processing of CMC components does face its own challenges. For example, there is a differential removal rate between the ceramic fibers and the matrix material of the CMC component, with the matrix material removed at a higher rate than the fibers, which can generate irregular side surfaces, e.g., having fibers stick out of the surfaces of the slot sides. Further, a dielectric fluid usually is used, e.g., as a coolant in EDM processes. As the EDM electrode advances toward a desired slot depth, dielectric flushing may become increasingly difficult and may stall, and the electrode may be damaged by arcing. Additionally, because EDM is a thermal machining process, it also may generate micro-cracks, although the cracks generated in EDM processes generally are much shorter than cracks created in some laser processes.

Therefore, improved electrodes for EDM processes, as well as improved EDM processes, would be desirable. In particular, an EDM electrode that minimizes side discharges to help minimize surface roughness and micro-cracks would be beneficial. Moreover, an EDM electrode that optimizes electrode wear and side discharges would be advantageous. Additionally, a method for forming a slot in a CMC component that minimizes surface roughness and micro-cracks within the slot would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a method for forming a feature in a ceramic matrix composite (CMC) component is provided. The method comprises advancing an electrode into the CMC component and retracting the electrode from the CMC component. The electrode is repeatedly advanced and retracted until a desired depth is reached. Further, the electrode is an electrode for electrical discharge machining, having a head end, a tip end, and a shaft extending from the head end to the tip end. The shaft has a first side and a second side, and each of the first side and the second side is recessed inward such that the head end and the tip end are wider than the shaft.

In another exemplary embodiment of the present disclosure, a method for forming a feature in a ceramic matrix composite (CMC) component is provided. The method comprises advancing an electrode into the CMC component; retracting the electrode from the CMC component; and feeding a dielectric fluid into the feature. The electrode is repeatedly advanced and retracted until a desired depth is reached. The electrode is an electrode for electrical discharge machining and has recessed sides such that the dielectric fluid is pumped into and out of the feature in a space formed between each recessed side and the CMC component.

In a further exemplary embodiment of the present disclosure, an electrode for electrical discharge machining is provided. The electrode defines a length direction, a width direction, and a height direction. The electrode includes a head end; a tip end; a shaft extending from the head end to the tip end; and a central plane defined through the head end, shaft, and tip end. The shaft is recessed along the width direction toward the central plane.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Figure 1:
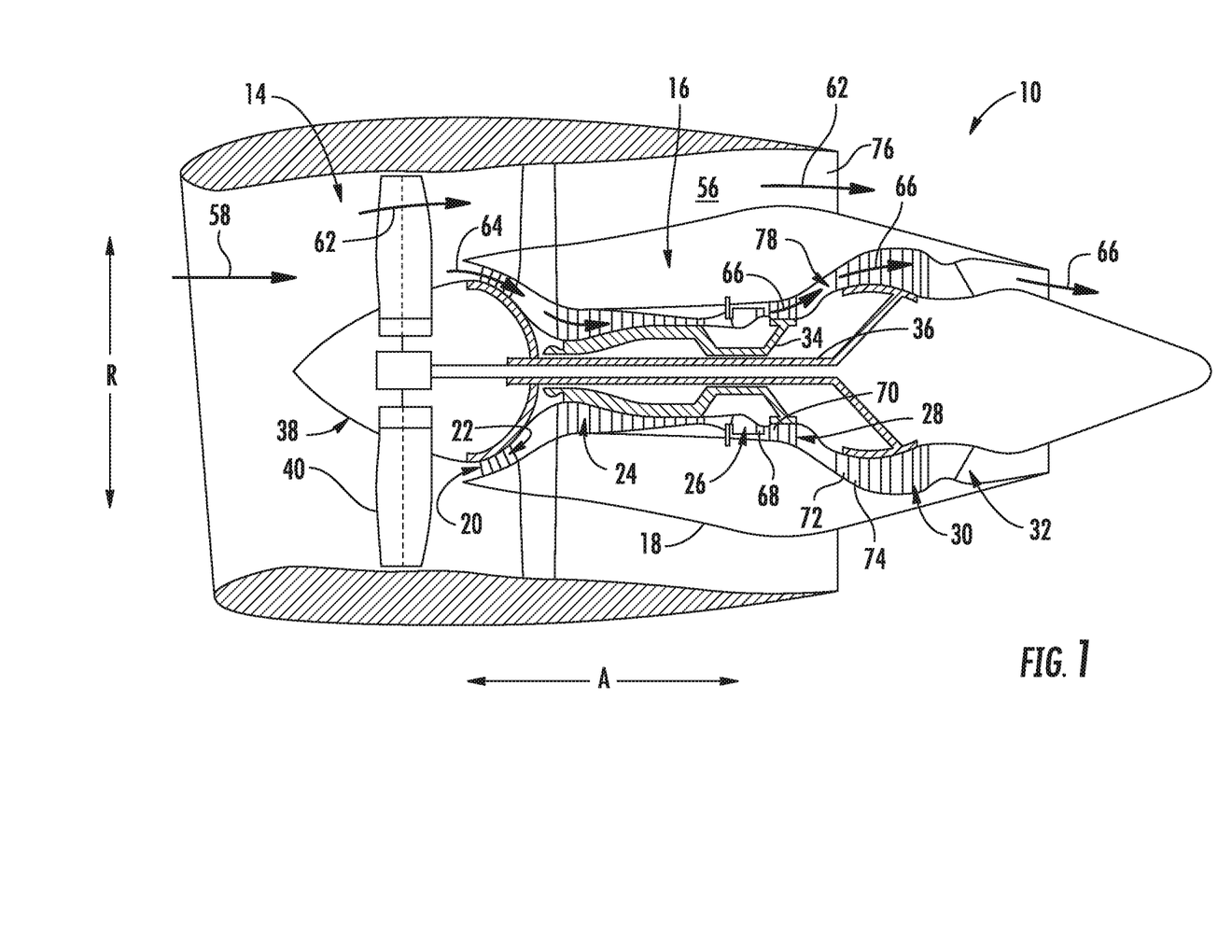
FIG. 1 provides a schematic cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a turbofan jet engine 10, referred to herein as "turbofan engine 10." As shown in FIG. 1, the turbofan engine 10 defines an axial direction A and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

During operation of the turbofan engine 10, a volume of air 58 enters turbofan 10. As the volume of air 58 passes across blades 40 of fan 38, a first portion 62 of the air 58 is directed or routed into a bypass airflow passage 56 and a second portion 64 of the air 58 is directed or routed into the LP compressor 22. The pressure of the second portion 64 of air is then increased as it is routed through the high pressure (HP) compressor 24 and into the combustion section 26, where it is mixed with fuel and burned to provide combustion gases 66. The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate and thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate and thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion 62 of air is substantially increased as the first portion 62 of air is routed through the bypass airflow passage 56 before it is exhausted from a fan nozzle exhaust section 76 of the turbofan 10, also providing propulsive thrust. Further, the HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, such as components of the combustion and/or turbine sections, may comprise a ceramic matrix composite (CMC) material, which is a non-metallic material having high temperature capability. Exemplary CMC materials utilized for such components may include silicon carbide (SiC), silicon nitride, or alumina matrix materials and combinations thereof. Ceramic fibers may be embedded within the matrix, such as oxidation stable reinforcing fibers including monofilaments like sapphire and silicon carbide (e.g., Textron's SCS-6), as well as roving and yarn including silicon carbide (e.g., Nippon Carbon's NICALON®, Ube Industries' TYRANNO®, and Dow Corning's SYLRAIVIIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Figure 2:
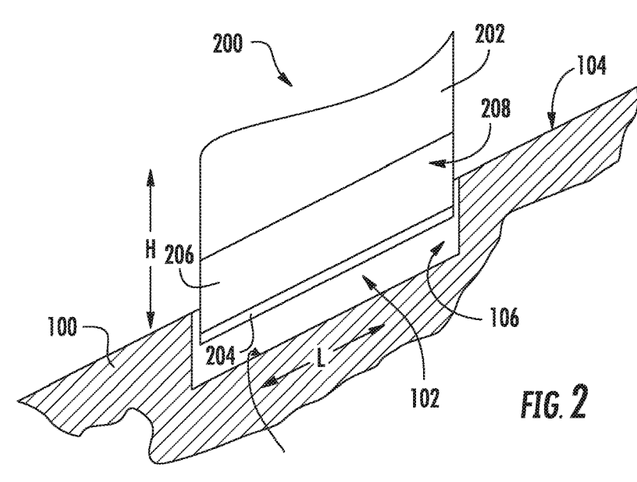
FIG. 2 provides a schematic view of a CMC component according to an exemplary embodiment of the present subject matter.

Turning to FIG. 2, a schematic view is provided of a process for machining a CMC component according to an exemplary embodiment of the present subject matter. For example, the exemplary CMC component 100 shown in FIG. 2 may be a CMC nozzle of a HP turbine stator vane 68 or LP turbine stator vane 72. Often, turbine nozzles require seals or sealing members to help prevent combustion gases 66 from leaking from the hot gas path 78 to, e.g., other portions of the core engine 16. Such seals or sealing members may be positioned in a slot 102 machined in a surface 104 of the nozzle to help ensure the seals are properly placed and do not shift position during assembly or engine use. Of course, although FIG. 2 illustrates one slot 102 defined in CMC component 100, one or more slots 102 may be defined in one or more surfaces 104 of CMC component 100 for receipt of seals or sealing members or for other purposes as well. Moreover, in other embodiments, one or more apertures, grooves, depressions, or other features, e.g., for providing cooling fluid to the CMC component, may be defined in CMC component 100 in addition to or as an alternative to slot 102 and in accordance with the processes described herein.

Seal slots such as slot 102 may have high aspect ratios, or a large ratio of slot depth to slot width. In some embodiments, the slot aspect ratio may range from about 1 to about 80, while in particular embodiments, the slot aspect ratio generally may be on the order of 5 or greater. In one exemplary embodiment, the slot depth may be about 0.160" and the slot width may be about 0.030", such that the aspect ratio is about 5.333. Typical slot widths may range from about 0.01" to about 0.1" but, in appropriate embodiments, may be as large as 1". In an exemplary embodiment, a high aspect ratio slot 102 may be defined using an electric discharge machining (EDM) process or technique. In an EDM process, an electrode 200 is used to cut the component 100 via electrical discharges from the electrode. As described in greater detail below, a dielectric oil or other dielectric fluid may be used to flush and clean the slot 102 as the electrode 200 advances within the component 100. The electrode 200 may have various configurations, e.g., to minimize electrical discharges from sides of the electrode and/or to increase the efficiency of the electrode. Side discharges may be undesirable because such discharges can result in surface roughness of the component by removing matrix material of the composite forming the component while leaving fibers of the composite material, and side discharges also can create micro-cracks in the component.

Figure 3:
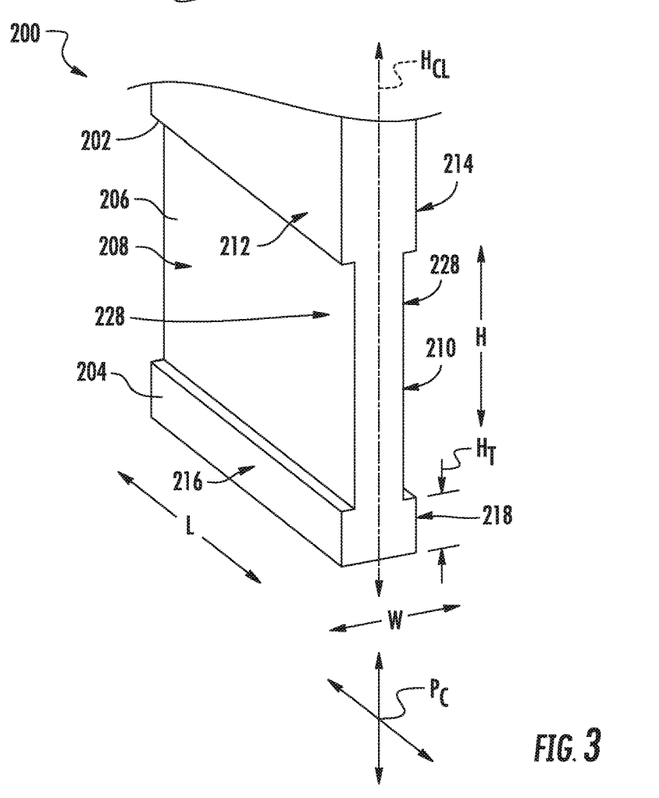
FIG. 3 provides a side perspective view of an EDM electrode according to an exemplary embodiment of the present subject matter.

FIG. 3 provides a side perspective view of electrode 200 according to an exemplary embodiment of the present subject matter. In the depicted embodiment, electrode 200 defines a length direction L, a width direction W, and a height direction H. The electrode 200 includes a head end 202 and a tip end 204 that are spaced apart from one another along the height direction H. A shaft 206 extends along the height direction H from the head end 202 to the tip end 204. In various embodiments, electrode 200 may be made from copper, graphite, copper tungsten, or another appropriate material or combination of materials.

As shown in FIG. 3, electrode 200 may have a generally rectangular shape but may have other shapes in other embodiments, e.g., electrode 200 generally may be shaped as a rhombus or parallelogram but other shapes may be used as well. Further, electrode 200 generally is longer and taller than it is wide, i.e., electrode 200 may extend further in the length direction L and height direction H than in the width direction W. A centerline $H_{CL}$, extending along the height direction at a central point along the electrode's width, as well as a central plane $P_C$ in which the centerline $H_{CL}$ lies and that extends in the height direction H and length direction L, may be defined through the head end 202, tip end 204, and shaft 206 of the electrode 200. Further, shaft 206 has a first side 208 and a second side 210, and in the exemplary embodiment illustrated in FIG. 3, first and second sides 208, 210 are each recessed toward the central plane P. That is, first side 208 and second side 210 of shaft 206 are recessed inward along the width direction W such that shaft 206 is recessed along the width direction W with respect to the head end 202 and tip end 204. More particularly, head end 202 may include a first side 212 and a second side 214, and tip end 204 may include a first side 216 and a second side 218. As shown in FIG. 3, the first side 208 of shaft 206 is recessed inward along the width direction W with respect to the first side 212 of head end 202 and the first side 216 of tip end 204. Similarly, the second side 210 of shaft 206 is recessed inward along the width direction W with respect to the second side 214 of head end 202 and second side 218 of tip end 204. As such, both the head end 202 and tip end 204 are wider than the shaft 206.

In other embodiments, only one of first side 208 and second side 210, rather than both first and second sides 208, 210, may be recessed. For example, in one embodiment, first side 208 may be recessed along the width direction W toward the central plane $P_C$, while second side 210 is not recessed. That is, first side 208 of shaft 206 may be recessed inward along the width direction W with respect to the first side 212 of head end 202 and the first side 216 of tip end 204, but second side 210 is not recessed with respect to second side 214 of head end 202 or second side 218 of tip end 204. In another embodiment, second side 210 may be recessed along the width direction W toward the central plane $P_C$ but first side 208 is not recessed with respect to first sides 212, 216 of head end 202 and tip end 204, respectively.

Figure 4:
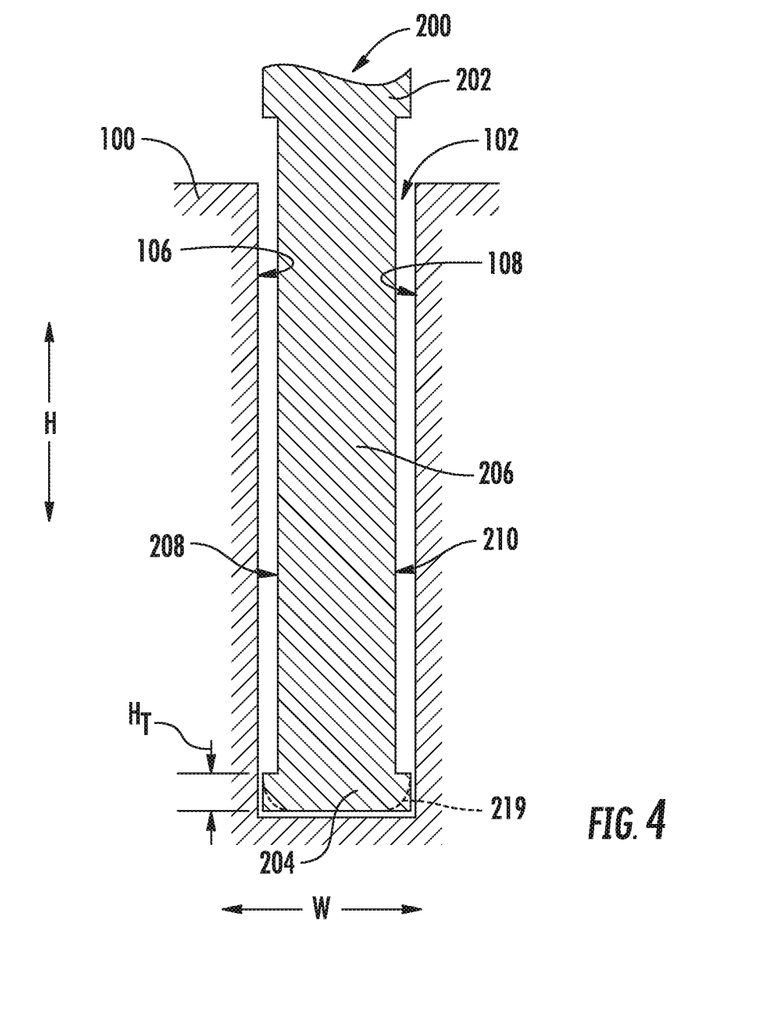
FIG. 4 provides a cross-section view of the exemplary electrode of FIG. 3 in the process of defining a slot in the exemplary CMC component of FIG. 2, according to an exemplary embodiment of the present subject matter.

FIG. 4 provides a cross-section view of the exemplary electrode 200 of FIG. 3 in the process of defining a slot 102 in the exemplary CMC component 100 of FIG. 2. As shown in FIG. 4, with first and second sides 208, 210 of shaft 206 recessed along the width direction W, the electrode 200 has a generally I-shaped cross-section in a plane extending in the width and height directions W, H. It will be appreciated that the cross-section may have other shapes if first and second sides 208, 210 are not recessed as shown in FIGS. 3 and 4. For example, electrode 200 may have a generally C-shaped cross-section if only second side 210 of shaft 206 is recessed along the width direction W as described above.

Further, tip end 204 has a height $H_T$ that defines a thickness of the tip end 204. The height $H_T$, and consequently the thickness of tip end 204, can be optimized to minimize side electrical discharges of the electrode while also ensuring any wear of tip end 204 does not extend beyond the thickness of the tip end. More specifically, tip end 204 would be expected to wear along its distal edges, shown by dashed lines 219 in FIG. 4. If tip end 204 is not sufficiently thick, the wear will continue inward along both the height direction H and the width direction W until the first side 216 of tip end 204 (FIG. 3) is generally coextensive with the first side 208 of shaft 206 and/or the second side 218 of tip end 204 (FIG. 3) is generally coextensive with the second side 210 of shaft 206, or until tip end 204 substantially has worn away. When the first side 216 and/or second side 218 of tip end 204 are generally coextensive with the sides of the shaft 206, the respective side(s) of the shaft are no longer recessed, and as such, side discharges cannot be minimized on the respective side(s). However, the height $H_T$ of tip end 204 also should be minimized to help minimize side discharges, i.e., to maximize an area over which electrode 200 is recessed inward and thereby reduce side discharges. Accordingly, the height $H_T$ of tip end 204 may be optimized to provide sufficient protection against tip end wear while minimizing an area over which side discharges could occur.

Further, the tip end height $H_T$ may be optimized to increase a cutting speed of the electrode 200, which can help increase the efficiency of electrode 200. More particularly, reducing the height $H_T$ of tip end 204, e.g., by recessing sides 208, 210 of the electrode shaft 206, can produce gains in cutting speed, especially as a cutting or slot depth increases; the speed gain may be less at shallower cutting depths. However, as previously described, the electrode wears as it cuts the CMC component 100; due to such wear, the tip end height $H_T$ decreases as the cutting depth increases. As a result, if the tip end height $H_T$ is increased to compensate for electrode wear, the greater initial tip height will not greatly impact the speed gain from recessing sides 208, 210, and greater increases in cutting speed may still be realized as the cutting depth increases and tip end 204 wears down (which reduces tip end height $H_T$). In some embodiments, a ratio of the tip end height $H_T$ to a desired or target slot depth may range from about 0.05 to about 0.5. In particular embodiments, the ratio of the tip end height $H_T$ to the desired or target slot depth may range from about 0.07 to about 0.3. In still other embodiments, the ratio of the tip end height $H_T$ to the desired or target slot depth may range from about 0.09 to about 0.1. Of course, other ratios of the tip end height $H_T$ to the desired or target slot depth may be used to optimize the electrode cutting speed, as well as tip end wear and side discharges from the tip end.

Figure 5:
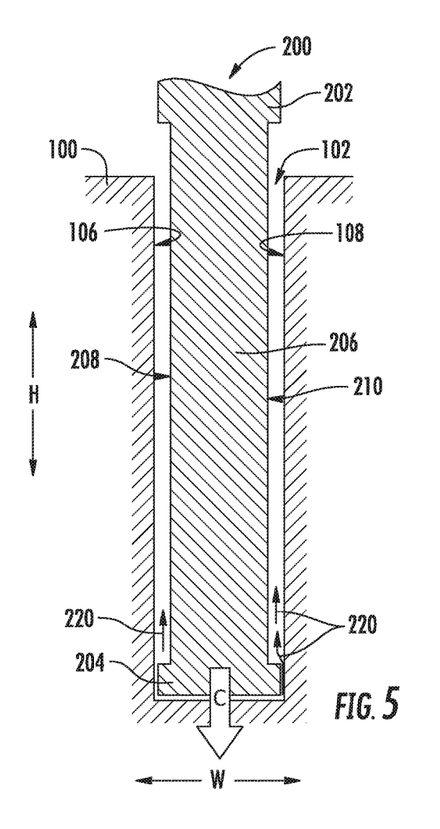
FIG. 5 provides an illustration of a portion of a method for operating the electrode of FIG. 3, according to an exemplary embodiment of the present subject matter.
Figure 6:
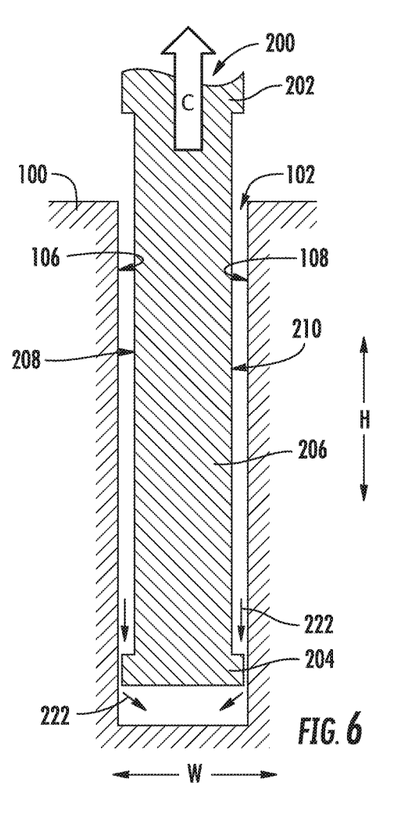
FIG. 6 provides an illustration of another portion of the method for operating the electrode of FIG. 3, according to an exemplary embodiment of the present subject matter.

Turning now to FIGS. 5 and 6, as well as referring back to FIG. 2, a method for operating electrode 200 is illustrated, according to an exemplary embodiment of the present subject matter. As shown in the figures, as electrode 200 cuts or forms slot 102 in component 100, the electrode may be repeatedly lowered or advanced (FIG. 5) and raised or retracted (FIG. 6) along a cutting direction C that defines a depth of the slot 102 and generally is parallel to the height direction H of electrode 200. The lowering and raising of electrode 200 may be referred to as electrode jumping.

As previously stated, a dielectric oil or other dielectric fluid may be used to flush and clean slot 102 during the EDM process. It will be appreciated that, with first and second sides 208, 210 of shaft 206 recessed as shown in FIGS. 5 and 6, the dielectric may be stored in the recesses created by recessed sides 208, 210 as electrode 200 advances to form slot 102. More particularly, the dielectric fluid may be stored in a space formed between each recessed side and the CMC component 100. As the electrode 200 is advanced into slot 102, the dielectric is pushed from the slot as illustrated by arrows 220, and some of the dielectric pushed from the slot may be stored in the recesses defined by recessed sides 208, 210. As the electrode 200 is retracted from slot 102, the dielectric, including at least some of the dielectric stored in the recesses, infiltrates the slot as shown by arrows 222. Some of the dielectric stored in the recesses may be discharged from the recesses such that the dielectric moves away from the slot 102; thus, dielectric containing debris such as removed matrix and fiber material may be removed from slot 102. In this way, the dielectric may be fed to slot 102, i.e., pumped into and out of slot 102, and the pumping of the dielectric is aided at least in part by the storage of the dielectric in the spaces between the recessed sides 208, 210 and CMC component 100. Moreover, in electrode jumping, the repeated advancing and retracting (or lowering and raising) of electrode 200 may intensify the flushing and cleaning effect of the dielectric by cycling the dielectric into and out of slot 102, which, for example, removes any debris created from machining slot 102. Further, rapid electrode jumping may create cavitation, which may additionally contribute to the removal of debris as well as fiber in the component material.

In some embodiments, after the electrode 200 machines slot 102 to a desired depth, electrode 200 may be used to "finish" the sides of the slot. More particularly, once the desired slot depth is reached, electrode 200 may be raised to approximately the level of surface 104. Then, electrode 200 may be orbited into slot 102 such that tip end 204 can finish the sides of the slot, such as a first side 106 and a second side 108 shown in FIGS. 2, 5, and 6. In finishing the slot 102, tip end 204 of electrode 200 may contact the surfaces defining the slot, such as sides 106 and 108, to smooth the slot surfaces, e.g., by removing fibers of the composite material of the component that may be protruding into slot 102. That is, the first and second sides 216, 218 of tip end 204 are relatively narrow or short, e.g., the height $H_T$ of tip end 204 is optimized as described above, such that there is little difference in the removal of matrix versus fiber of the composite material by the tip end 204. As such, by orbiting electrode 200 to finish slot 102 with tip end 204, tip end 204 can help even up the amount of matrix and fiber that is removed from component 100 to form slot 102 and thereby make the surfaces of slot 102 relatively smooth.

Figure 7:
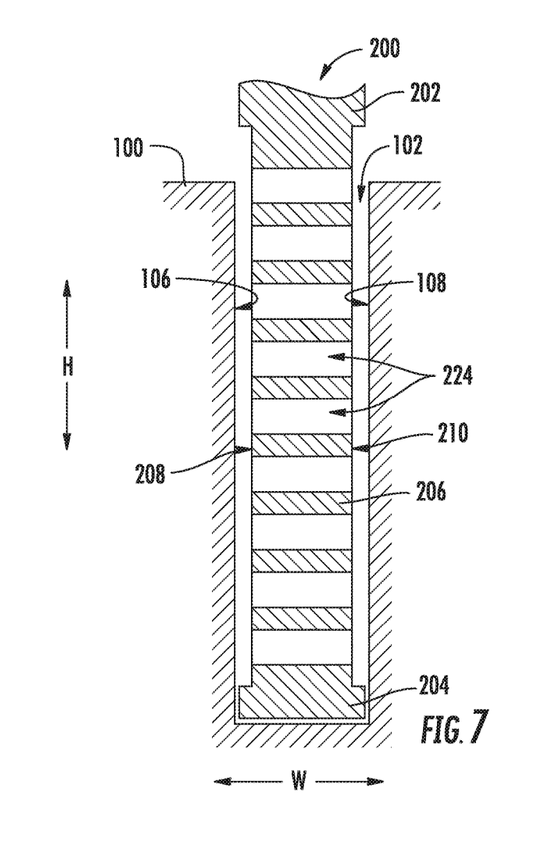
FIG. 7 provides a cross-section view of the electrode of FIG. 3, according to another exemplary embodiment of the present subject matter.
Figure 8:
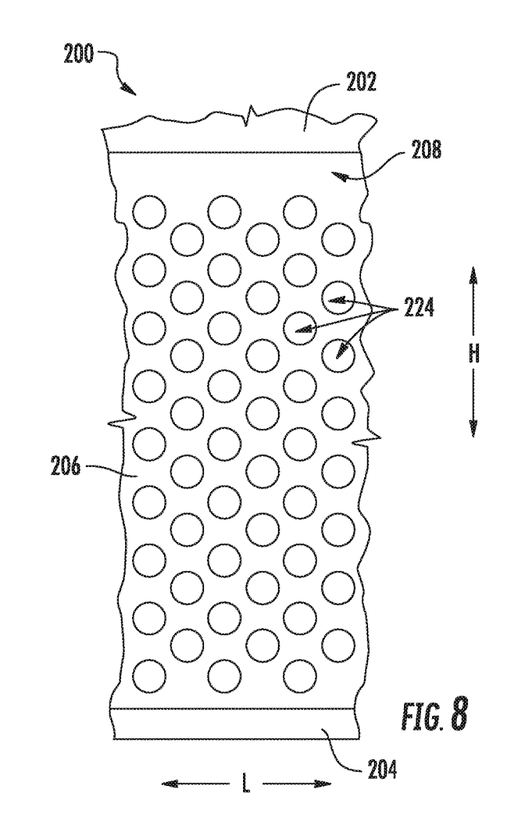
FIG. 8 provides a side view of the exemplary electrode of FIG. 7.

Referring to FIGS. 7 and 8, in another exemplary embodiment of electrode 200, a plurality of apertures 224 is defined through the shaft 206, from the first side 208 to the second side 210 of shaft 206. Apertures 224 permit fluid communication from the first side 208 to the second side 210 and vice versa. As such, apertures 224 may, e.g., allow storage of dielectric in addition to the dielectric stored in the recesses defined by recessed first and second sides 208, 210 of shaft 206. As described above, the dielectric fluid may help flush and clean the slot 102 as the slot is formed by electrode 200, and any additional dielectric may entrain more debris than a nominal amount of dielectric and thereby help flush the debris from slot 102.

Although depicted in FIGS. 7 and 8 with generally circular cross-sectional shapes and substantially similar cross-sectional shapes and areas, apertures 224 may have any suitable cross-sectional shapes and sizes. For example, apertures 224 may have circular, square, oval, or other polygonal or suitable shapes. In some embodiments, the cross-sectional shape and/or size may vary from one aperture 224 to another aperture 224. Further, a ratio of a volume defined by apertures 224 to a remaining, solid volume of shaft 206 may be optimized to provide a maximum amount of dielectric storage while maintaining sufficient electrode rigidity.

Figure 9:
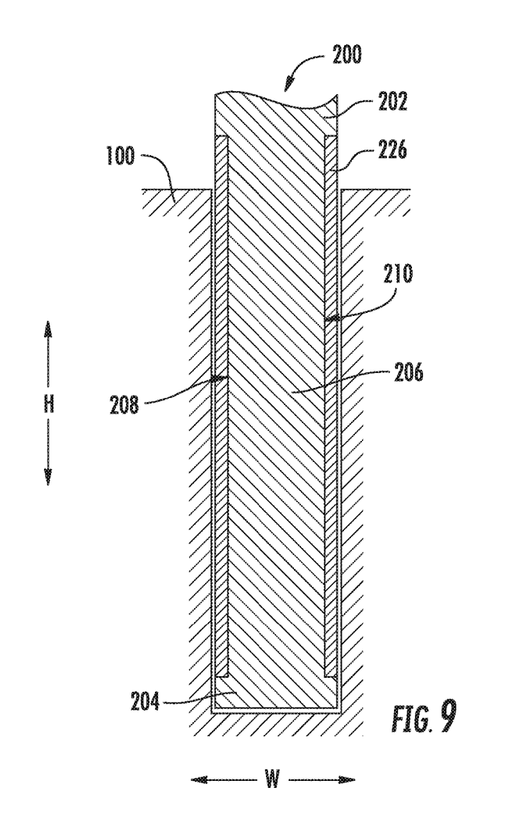
FIG. 9 provides a cross-section view of the electrode of FIG. 3, according to another exemplary embodiment of the present subject matter.
Figure 10:
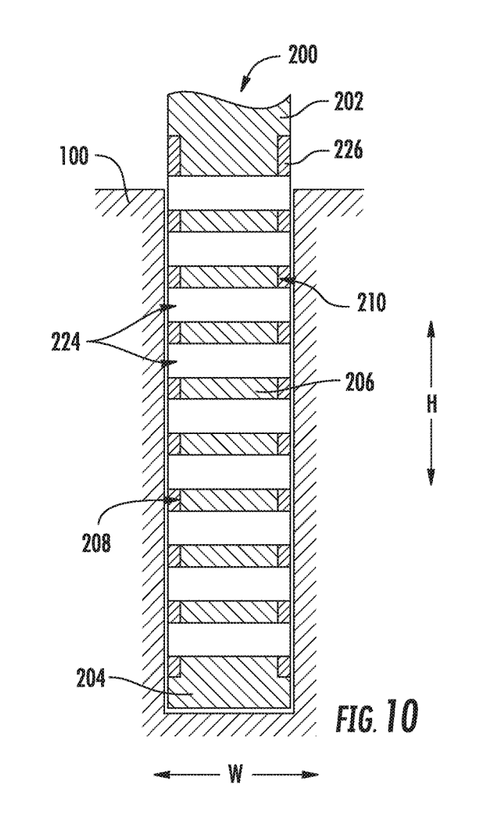
FIG. 10 provides a cross-section view of the electrode of FIG. 7, according to another exemplary embodiment of the present subject matter.

Turning to FIGS. 9 and 10, an insulation material 226 may be applied to the shaft 206 to help prevent side discharges. More particularly, insulation material 226 may be applied to each of first side 208 and second side 210 of shaft 206 to help prevent electrical discharges from sides 208, 210 of shaft 206. In various embodiments, the insulation material 226 may be a polymer such as polytetrafluoroethylene (PTFE, which is sold in various formulations under the brand name Teflon™), polypropylene, polyester, or the like, and the insulation material 226 may be applied by coating or taping shaft 206 or by using another suitable technique for covering shaft 206 with insulation 226. In other embodiments, insulation material 226 may be a ceramic material, such as aluminum oxide. As an example of such embodiments, an aluminum oxide insulation material 226 may be applied to an electrode 200 having an aluminum shaft 206 by anodizing the shaft. Insulation 226 may be made from other materials as well and may be applied using any suitable technique and may have any suitable thickness.

As illustrated in FIG. 10, in embodiments in which apertures 224 are defined through shaft 206, the apertures 224 may be defined through any insulation material 226 covering shaft 206 such that the apertures 224 extend through insulation material 226 and shaft 206. Alternatively, the insulation material 226 may cover first and second sides 208, 210 as well as the surfaces defining apertures 224 such that the insulation material 226 extends through shaft 206. Further, it will be appreciated that insulation material 226 may be applied to any appropriate surface of electrode 200.

Figure 11:
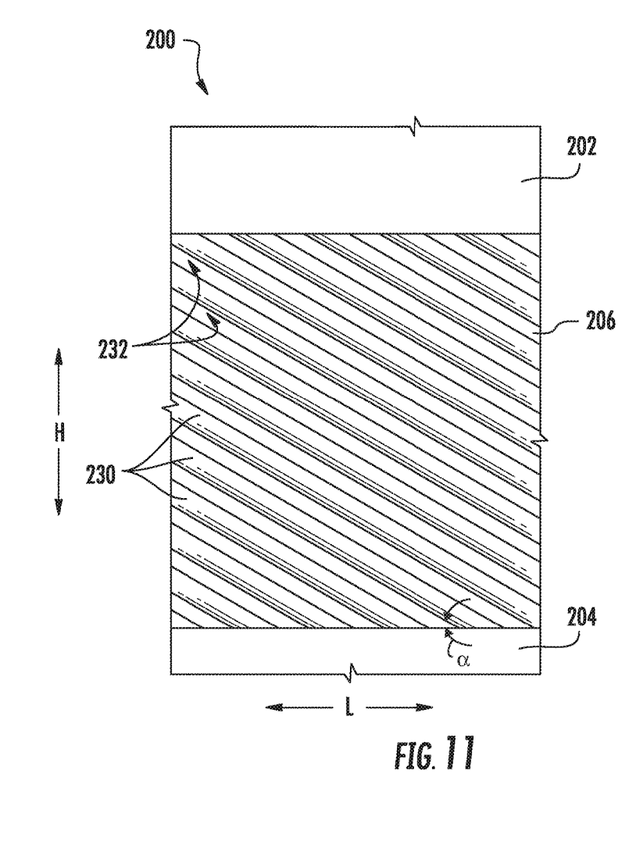
FIG. 11 provides a side view of the electrode of FIG. 3, according to another exemplary embodiment of the present subject matter.
Figure 12:
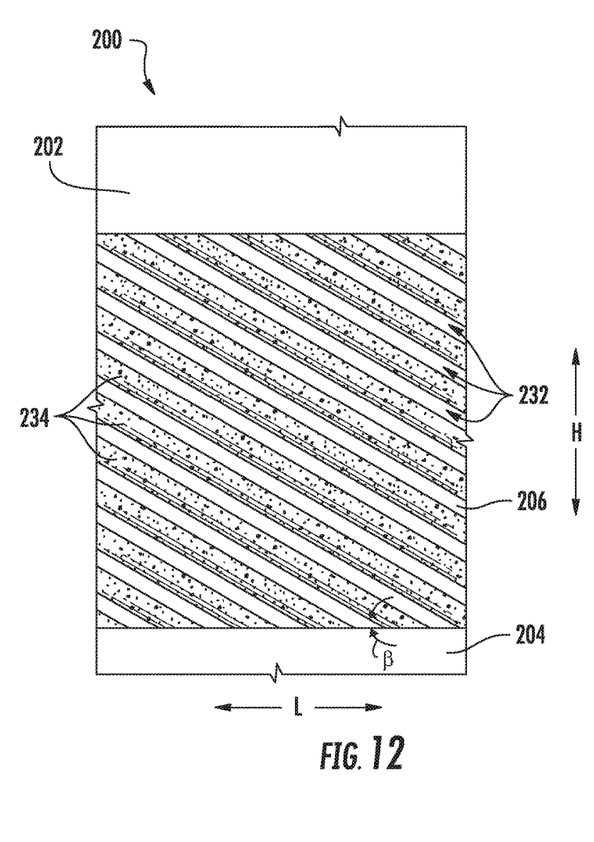
FIG. 12 provides a side view of the electrode of FIG. 3, according to another exemplary embodiment of the present subject matter.

FIGS. 11 and 12 provide side views of electrode 200 according to other exemplary embodiments of the present subject matter. Referring back to FIG. 3, the shaft 206 has an outer surface 228, and as shown in FIG. 11, a plurality of fins 230 may be included along the outer surface 228. More particularly, in the exemplary embodiment of FIG. 11, each fin 230 is a generally linear feature that projects from outer surface 228 along the width direction W. In some embodiments, fins 230 may be attached to the outer surface 228 along recessed first and second sides 208, 210 of shaft 206. In other embodiments, a plurality of grooves 232 may be machined, etched, or otherwise defined in first and second sides 208, 210, with the portion of outer surface 228 between grooves 232 forming fins 230. Fins 230 may be defined in other ways as well. In some embodiments, fins 230 are made from a material that is electrically non-conductive. In other embodiments, fins 230 may be insulated as described with respect to FIGS. 9 and 10 to minimize electrical side discharges.

It will be understood that the dielectric fluid may be retained in the space between fins 230, e.g., within grooves 232. As previously described, the dielectric within slot 102 becomes contaminated with debris from the EDM process of defining slot 102. Fins 230 may help drive or pump contaminated dielectric from slot 102, e.g., by moving contaminated dielectric from slot 102 as the electrode 200 is raised or retracted from the slot and by pumping "fresh" or less contaminated dielectric into slot 102 as the electrode 200 advances into the slot. As such, fins 230 and/or grooves 232 may have a shape and/or may be positioned to enhance the pumping effect. For example, in the depicted embodiment of FIG. 11, each of the plurality of fins 230 is positioned and each of the plurality of grooves 232 is defined at an angle α with respect to the length direction L of electrode 200. In alternative embodiments, the fins 230 and/or grooves 232 may be positioned or defined substantially parallel to the length direction L or substantially parallel to the height direction H, i.e., perpendicular to the length direction L. Moreover, as stated, fins 230 and/or grooves 232 may have any suitable shape for helping pump dielectric into and out of slot 102.

Turning to FIG. 12, in other embodiments, a plurality of abrasive pads 234 may be included on the outer surface 228 of the shaft 206. In the exemplary embodiment of FIG. 12, each of the abrasive pads 234 is configured as a generally linear feature projecting or raised from outer surface 228 of shaft 206 along the width direction W, with an abrasive material bonded thereto or otherwise disposed thereon. As shown, abrasive pads 234 may be configured similar to fins 230, e.g., abrasive pads 234 are positioned at an angle β with respect to the length direction L in FIG. 12, but in other embodiments, abrasive pads 234 may extend substantially parallel to the length direction L or substantially parallel to the height direction H, i.e., perpendicular to the length direction L. Also similar to fins 230, the abrasive pads 234 may be attached or coupled to shaft 206 or created by defining grooves 232 in first and second sides 208, 210. In one embodiment, abrasive pads 234 are formed by electrolytic plating of shaft 206. The abrasive material may be, e.g., diamond grits that are bonded to the raised pads. Of course, other ways of defining pads 234 and other abrasive materials may be used as well.

As electrode 230 jumps in and out of slot 102 to machine the slot to a desired depth, the abrasive pads help pump dielectric in and out of the slot 102, similar to the pumping effect of fins 230 described above. That is, abrasive pads 234 may help drive or feed fresh dielectric into slot 102 while removing contaminated dielectric (e.g., dielectric loaded with debris such as ceramic fibers) from slot 102. Additionally, the abrasive material of abrasive pads 234 has a lapping effect. More specifically, with the reciprocal motion of electrode 200 in and out of slot 102, the abrasive material of pads 234 grinds first and second sides 106, 108 of slot 102. As the electrode 200 jumps inward toward a bottom 110 of the slot 102, the abrasive pads 234 lap the sides 106, 108 of slot 102 to remove material forming the component 100. As the electrode 200 is retracted, i.e., jumps outward away from the bottom 110 of the slot 102, the abrasive pads 234 again lap the sides 106, 108 of the slot 102, removing material from component 100. As described, the removed material may be entrained in the dielectric fluid, and the abrasive pads 234 also may provide a pumping effect to pump out the dielectric containing such removed material from slot 102 and pump in comparatively "cleaner" dielectric, i.e., dielectric with less removed material entrained therein.

Although described above with respect to machining a CMC component, it will be appreciated that the electrodes and methods described herein may be used with workpieces comprising other materials, such as metals, alloys, or other composite materials. Further, it should be understood that any suitable dielectric fluid and electrode material may be utilized.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. An electrode for electrical discharge machining, the electrode defining a length direction, a width direction, and a height direction, the electrode comprising:
    a head end;
    a tip end;
    a shaft extending from the head end to the tip end; and
    a central plane defined through the head end, shaft, and tip end,
    wherein the shaft is recessed along the width direction toward the central plane such that both the head end and the tip end are wider than the shaft, and
    wherein the electrode is configured to discharge electricity to machine a component and
    wherein the tip end has a height, and wherein the ratio of the height of the tip end to a slot depth for the component is within a range of 0.05 to 0.5.

2. The electrode as in claim 1, wherein the shaft has a first side and a second side, and wherein the first side is recessed along the width direction toward the central plane.

3. The electrode of claim 2, wherein the second side is recessed along the width direction toward the central plane.

4. The electrode of claim 1, wherein the shaft has a first side and a second side, and wherein a plurality of apertures is defined through the shaft from the first side to the second side.

5. The electrode of claim 1, further comprising an insulation material on an outer surface of the shaft.

6. The electrode of claim 5, wherein the shaft has a first side and a second side, and wherein a plurality of apertures are defined through the insulation material and the shaft, the plurality of apertures defined from the first side to the second side.

7. The electrode of claim 1, wherein the shaft has an outer surface, and wherein the shaft includes a plurality of fins along the outer surface.

8. The electrode of claim 1, wherein the shaft has an outer surface, and wherein a plurality of grooves is defined in the outer surface of the shaft.

9. The electrode of claim 1, wherein the shaft has an outer surface, and wherein a plurality of abrasive pads is defined on the outer surface of the shaft.

10. The electrode of claim 1, wherein the tip end has a height, the height of the tip end selected to optimize a cutting speed of the electrode.

11. An electrode for electrical discharge machining, the electrode defining a length direction, a width direction, and a height direction, the electrode comprising:
    a head end;
    a tip end;
    a shaft extending from the head end to the tip end;
    an insulation material on an outer surface of the shaft; and
    a central plane defined through the head end, shaft, and tip end,
    wherein the shaft is recessed along the width direction toward the central plane,
    wherein the shaft has a first side and a second side, and wherein a plurality of apertures are defined through the insulation material and the shaft, the plurality of apertures defined from the first side to the second side.

* * * * *